United States Patent
Carne et al.

[15] 3,707,066
[45] Dec. 26, 1972

[54] GAS PURIFICATION

[72] Inventors: Michael Carne, London; Kenneth Cecil Smith, Roydon; David Arthur Webber, Bishop's Stortford, all of England

[73] Assignee: The British Oxygen Company Limited, London, England

[22] Filed: July 16, 1970

[21] Appl. No.: 55,400

[30] Foreign Application Priority Data

July 16, 1969  Great Britain .................... 35894

[52] U.S. Cl. .......................... 55/88, 55/222, 55/264, 55/269, 62/11
[51] Int. Cl. .............................................. B01d 5/00
[58] Field of Search ...... 55/83, 84, 88, 263, 260, 261, 55/5, 9, 264, 461, 222, 267, 268, 269; 62/9, 10, 11

[56] References Cited

UNITED STATES PATENTS

| | | | |
|---|---|---|---|
| 152,660 | 6/1874 | MacKenzie et al. | 55/83 |
| 1,051,051 | 1/1913 | Zekendorf | 55/83 |
| 1,235,535 | 7/1917 | Bowman | 55/263 |
| 1,282,338 | 10/1918 | Weir | 55/88 |
| 1,563,125 | 11/1925 | Ward | 55/263 X |
| 1,613,108 | 1/1927 | Hosmer | 55/88 |
| 1,796,755 | 3/1931 | Hosmer | 55/88 X |
| 1,883,373 | 10/1932 | Hedberg | 55/5 |
| 2,143,365 | 1/1939 | Agren | 55/9 X |
| 2,271,642 | 2/1942 | Holzwarth | 55/461 X |

FOREIGN PATENTS OR APPLICATIONS 144,701  6/1920  Great Britain .......................... 55/122

Primary Examiner—Dennis E. Talbert, Jr.
Attorney—Dennison, Dennison, Townshend & Meserole

[57] ABSTRACT

A method for reducing the level of impurities in a gaseous feedstock by mixing a solvent gas with the feedstock, cooling to a temperature at which a portion of the gas mixture condenses to give an impurity-rich liquid and separating the liquid from the uncondensed portion.

6 Claims, 1 Drawing Figure

PATENTED DEC 26 1972
3,707,066
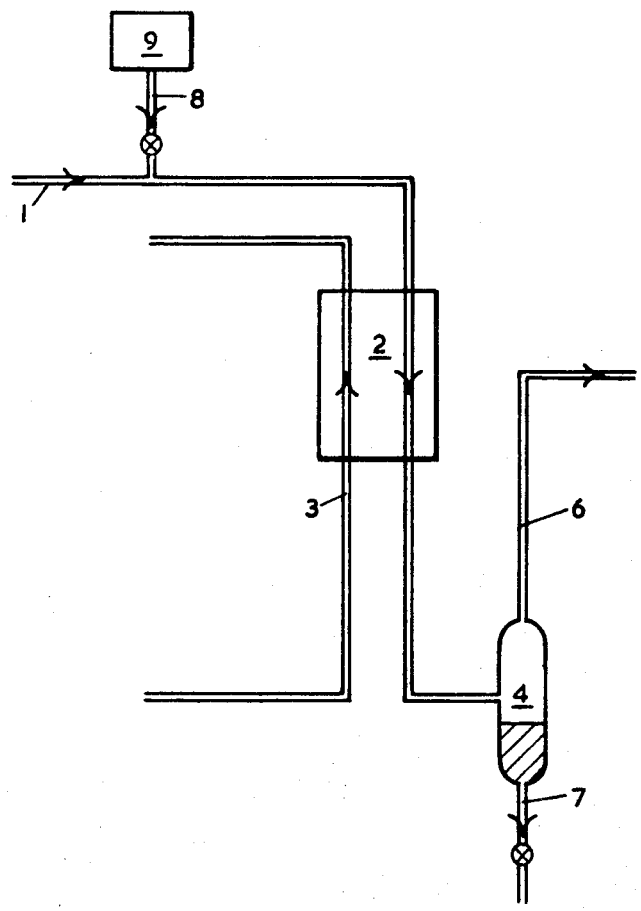
INVENTORS
MICHAEL CARNE, ET AL
BY Hennisan, Hennisan, Townshend &
Meserole  ATTORNEYS

GAS PURIFICATION

FIELD OF THE INVENTION

The invention relates to gas purification and more particularly to a method of removing impurities from a gas by cooling and fractional condensation.

DESCRIPTION OF THE PRIOR ART

In gas cooling processes, especially those involving liquefaction, it is necessary that high melting point impurities be removed before a temperature is reached at which they settle within the solid phase, thereby causing obstruction of the gas or liquid passages in the heat exchangers and other parts of the cooling system.

Natural gas, for example, usually contains as high melting point impurities, C7, C8 and C9 hydrocarbons and also benzene. For technical and economic reasons it is not convenient to remove such impurities completely nor in general is it necessary to do so. It is, however, necessary to reduce their concentration to such a level that solid phase separation does not occur during the cooling. To attain such a level by partial liquefaction and condensate removal it is necessary, particularly in respect of residual benzene, to cool the natural gas to a temperature at which a significant portion of the feed gas is condensed and thus requires considerable refrigeration.

SUMMARY OF THE INVENTION

According to the invention there is provided a method for removing impurities from a gaseous feedstock comprising introducing into the feedstock a solvent gas to form a gaseous mixture, the solvent gas having in its liquid state a preferential solvent effect upon the impurities, cooling the mixture to a temperature below its dew point and separating the so formed liquefied portion containing solvent gas and impurities, from the non-liquefied portion of the feedstock.

The solvent gas should have a higher boiling point than a major part of the feedstock and should have in its liquid state a solvent effect upon at least a part of the impurities. Thus, the invention also provides a method for reducing the impurity content of a gaseous feedstock which comprises forming a gaseous mixture of the feedstock and a solvent gas that has a higher boiling point than a major part of the feedstock and has in its liquid state a solvent effect upon at least a part of the impurities, cooling the gaseous mixture to a temperature at which a major part of the solvent gas and up to 5 molar percent of the feedstock has condensed and separating the so formed impurity-rich liquid from the non-liquefied portion of the feedstock.

The mixture of the feedstock and solvent gas is preferably cooled to a temperature which produces the required impurity removal consistent with minimum refrigeration. Too high a temperature will not produce sufficient liquefaction to reduce the impurities to a tolerable level. Too low a temperature causes increased liquefaction of low boiling components thereby wasting refrigeration.

It is not essential that the solvent gas be pure and indeed in many applications it may be convenient to employ a readily available commercial grade. The solvent gas must not, however, contain any troublesome impurities which are not reduced to a tolerable level during the partial condensation state. Similarly it must not leave a troublesome residue after the partial condensation.

The solvent gas may be introduced into the feedstock gas in either its liquid or gaseous state. If added in the liquid state it must be allowed to vaporize before the gas is cooled.

Since the components of a liquid exert a finite partial pressure, the supernatant vapor of the condensed liquid containing the impurities will contain small amounts of 'heavies' (that is to say the high boiling components of the feedstock). For this reason it is not possible completely to remove all of the 'heavies' by such a simple partial condensation method.

In its liquid state the solvent gas dissolves those impurities for which it was a high Henry's law constant, thereby reducing their partial pressure in the supernatant vapor. By an appropriate choice of the solvent it is therefore possible to remove the more troublesome impurities preferentially.

The requisite amount of solvent gas will be determined by the degree of purification required and can be found by simple experiment in any particular case.

The method of the invention is particularly suitable for removing 'heavies,' comprising mainly C7, C8, C9 impurities and benzene, from natural hydrocarbon gas and is a particularly useful step in a process for the liquefaction of natural hydrocarbon gas. If the method of the invention is used as part of such a liquefaction process the residual amounts of solvent gas after the partial liquefaction of the invention are preferably miscible with the final liquid product of the process and the solvent gas should therefore preferably be of a type which permits this.

Examples of suitable solvents for reducing the amount of such 'heavies' in natural hydrocarbon gas are butane, pentane, hexane and certain isomers thereof, propane, propylene and toluene. Mixtures of two or more such gases can be employed. Suitable mixtures are commercially available from petroleum cracking processes.

In the case of natural hydrocarbon gas containing 0.5 percent of heavies a solvent gas such as pentane preferably forms between 0.5 percent and 2.0 percent of the resultant mixture.

The process of the invention provides the advantage of a reduction in refrigeration to achieve a given amount of impurity removal.

The present invention will now be described by way of an example and with reference to the accompanying drawing which is a diagrammatic representation of a method for purifying natural hydrocarbon gas. All percentages in this example and throughout the specification are molar percentages.

The purification apparatus is supplied with a feedstock of impure natural hydrocarbon gas, from which water and carbon dioxide have been removed, containing non-troublesome components such as nitrogen, ethane and propane, and 'heavies' comprising mainly C7, C8 and C9 hydrocarbons and some benzene. The 'heavies' are particularly troublesome if the natural gas is to be subsequently liquefied because to liquefy natural gas it is necessary to cool it to a temperature at which the solubility of the 'heavies' is low.

The feedstock is introduced through the conduit 1. Liquefied pentane stored in a cylinder 9 is injected into the feedstock stream via a conduit 8, vaporizes in the conduit 1 and mixes intimately with the feedstock. The feedstock, fortified with pentane, is passed through a heat exchanger 2, wherein it is cooled by a refrigerant flowing through conduit 3 to effect partial liquefaction. The partially liquefied gas is passed into a separator 4 wherein the liquefied portion, which contains a major part of the added pentane and a high proportion of the 'heavies,' is separated from the gaseous portion. The purified natural gas is removed through a conduit 6, the liquefied portion being withdrawn through a conduit 7.

For the purpose of comparison a run was conducted in such an arrangement but without the introduction of a solvent gas. A natural gas feedstock having the composition shown in Table 1 was cooled to 210K at 40 bars producing about 1 percent liquefaction of the natural gas. The liquefied portion was then separated from the gas. The composition of the separated gas is shown in Table 2.

Table 1

| Component | Concentration |
|---|---|
| methane | 94% |
| nitrogen | 0.6% |
| ethane | 3.9% |
| propane | 0.9% |
| iso-butane | 0.1% |
| n-butane | 0.2% |
| C5 hydrocarbons | 230 vpm |
| C6 hydrocarbons | 370 vpm |
| C7 hydrocarbons | 720 vpm |
| C8 hydrocarbons | 650 vpm |
| C9 hydrocarbons | 200 vpm |
| toluene | 280 vpm |
| benzene | 530 vpm Plus other unspecified impurities. |

Table 2

| Component | Concentration |
|---|---|
| methane | 95% |
| nitrogen | 0.6% |
| ethane | 3.9% |
| propane | 0.6% |
| iso-butane | 0.06% |
| n-butane | 0.006% |
| C5 hydrocarbons | 21 vpm |
| C6 hydrocarbons | 5 vpm |
| C7 hydrocarbons | 4 vpm |
| C8 hydrocarbons | 1 vpm |
| C9 hydrocarbons | not detected |
| toluene | not detected |
| benzene | 14 vpm Plus other unspecified impurities. |

It will be noted that the troublesome impurities are not completely removed and in particular the concentration of benzene is still somewhat high. Benzene is the most troublesome of all the 'heavies' and its concentration is above the tolerable maximum of most natural gas liquefaction apparatus.

A run was then conducted according to the process of the invention to reduce the amount of impurity benzene. 0.8 percent of pentane was added to a natural gas feedstock, having a composition substantially as shown in Table 1. The mixture was then cooled to 230K, producing about 2 percent liquefaction. After separation the purified natural gas was found to have the composition shown in Table 3.

Table 3

| Components | Concentration |
|---|---|
| methane | 95% |
| nitrogen | 0.6% |
| ethane | 3.4% |
| propane | 0.6% |
| iso-butane | 0.06% |
| n-butane | 0.06% |
| C5 hydrocarbons | 680 vpm |
| C6 hydrocarbons | 7 vpm |
| C7 hydrocarbons | 6 vpm |
| C8 hydrocarbons | 3 vpm |
| C9 hydrocarbons | not detected |
| toluene | not detected |
| benzene | 3 vpm |
| Plus other unspecified impurities. | |

It will be observed that the addition of pentane has allowed the purification process to be effected at about 20K higher than previously. Without pentane, natural gas having the composition shown in Table 1, would have produced substantially no liquefaction at 230K. Although the present method has not removed the C7 and C8 impurities to the same extent as previously, it will be noted that the concentration of benzene has been reduced about five-fold. It will also be observed that the concentration of pentane is about 30 times higher than after the previous method. Pentane is however, readily soluble in liquefied natural gas. A natural gas having a composition as shown in table 3 may in fact be liquefied with substantially no solidication problems.

In further runs according to the process of the invention the addition of 1.1 percent of propane to the natural gas and operation of the separator at 210K gave a residual benzene concentration of 8 vpm and the addition of 0.4 percent propane and 0.6 percent butane in admixture gave a residual benzene concentration of 6 vpm.

We claim:

1. A method for reducing the content of aromatic hydrocarbon impurities and C7 and heavier aliphatic hydrocarbon impurities in a natural gas feedstock which comprises forming a gaseous mixture of the feedstock and a solvent hydrocarbon gas that has a higher boiling point than a major part of the feedstock and has in its liquid state a solvent effect upon at least a part of the impurities, cooling the gaseous mixture of elevated pressure to a temperature at which a major part of the solvent gas and up to 5 molar percent of the feedstock is condensed and separating the so formed impurity-rich liquid from the non-liquefied portion of the feedstock.

2. A method according to claim 1 wherein the solvent gas is introduced in the liquid state into the feedstock and is allowed to vaporize before the cooling.

3. A method according to claim 1, wherein the solvent gas is selected from the group comprising butane, pentane, isomers of hexane, propane, propylene and toluene.

4. A method according to claim 3, wherein the solvent gas is a commercial mixture from a petroleum cracking process.

5. In a process for the liquefaction of natural gas feedstock including the step of reducing the content of aromatic hydrocarbon impurities and C7 and heavier aliphatic impurities in the feedstock by cooling the feedstock at elevated pressure to a temperature at which a major part of the impurities liquefy and separating the so formed impurity-rich liquid from the non-liquefied portion of the feedstock, the improvement comprising introducing into the feedstock prior to the cooling a solvent hydrocarbon gas that has a higher boiling point than a major part of the feedstock and has in its liquid state a solvent effect upon at least a part of the impurities, whereby for a given degree of impurity reduction the amount of refrigeration required to effect the cooling is able to be reduced.

6. An improved process according to claim 5, wherein the solvent hydrocarbon gas is drawn from a source separate from the feedstock.

* * * * *